(12) United States Patent
Smith et al.

(10) Patent No.: US 7,992,668 B2
(45) Date of Patent: Aug. 9, 2011

(54) LOW-ANGLE SPLINE COUPLING FOR POWER TRANSMISSION UNITS

(75) Inventors: Burke Smith, Syracuse, NY (US); William A. Hellinger, Mexico, NY (US); Carl F. Stephens, Liverpool, NY (US); David W. Wenthen, Syracruse, NY (US)

(73) Assignee: Magna Powertrain of America, Inc. MI (US)

( * ) Notice: Subject to any disclaimer, the term of this patent is extended or adjusted under 35 U.S.C. 154(b) by 233 days.

(21) Appl. No.: 12/481,797

(22) Filed: Jun. 10, 2009

(65) Prior Publication Data
US 2010/0314189 A1 Dec. 16, 2010

(51) Int. Cl.
*B60K 17/34* (2006.01)
*B60K 23/08* (2006.01)

(52) U.S. Cl. .................. 180/247; 180/233; 180/245

(58) Field of Classification Search .......... 180/233, 180/245, 247, 248
See application file for complete search history.

(56) References Cited

U.S. PATENT DOCUMENTS

| | | | | |
|---|---|---|---|---|
| 3,262,512 | A | * | 7/1966 | O'Brien .................. 180/245 |
| 4,688,447 | A | | 8/1987 | Dick |
| 5,725,453 | A | * | 3/1998 | Zalewski et al. ............. 475/204 |
| 6,512,972 | B1 | * | 1/2003 | Glab et al. .................. 701/69 |
| 6,780,132 | B2 | * | 8/2004 | Cook et al. .................. 475/149 |
| 6,805,217 | B2 | * | 10/2004 | Kinouchi et al. ............. 180/233 |
| 6,817,434 | B1 | * | 11/2004 | Sweet ..................... 180/245 |
| 7,377,351 | B2 | * | 5/2008 | Smith et al. ................ 180/233 |
| 7,399,250 | B2 | | 7/2008 | Gansloser et al. |
| 2003/0111285 | A1 | * | 6/2003 | Gansloser et al. ............ 180/233 |
| 2004/0168845 | A1 | * | 9/2004 | Bellich et al. .............. 180/247 |
| 2007/0295548 | A1 | * | 12/2007 | Boctor et al. ............... 180/245 |
| 2008/0099267 | A1 | * | 5/2008 | Ruehle et al. ............... 180/233 |

OTHER PUBLICATIONS

Dr, Ing, Joerg Boerner, Dipl.-ing. Klemens Humm, Dr.-Ing. Franz J. Joachim Development of Conical Involute Gears (Beveloids) for Vehicle Transmissions Nov./Dec. 2005 Gear Technology p. 28-35.
8. European All Wheel Drive Congress Graz 19. und 20. Apr. 2007 Allradtechnik im Spannungsfeld Zwischen Komplexitat und Kundennutzen 9 pages Gerhard Henning, DaimlerChrysler AG.

* cited by examiner

*Primary Examiner* — Paul N Dickson
*Assistant Examiner* — Marc A Scharich
(74) *Attorney, Agent, or Firm* — Harness, Dickey & Pierce, P.L.C.

(57) ABSTRACT

A power transmission device for a four-wheel drive vehicle includes an input shaft adapted to be driven by a power source. A first output shaft is rotatable about a first axis and adapted to transmit torque to a first driveline. A second output shaft is adapted to transmit torque to a second driveline and is rotatable about a second axis. The first and second axes diverge from one another. A transfer unit includes a drive member driven by the first output shaft and a driven member driving the second output shaft. A spline coupling is positioned within a cavity formed in the driven member to drivingly interconnect the driven member and the second output shaft. The second output shaft is axially moveable relative to the driven member.

13 Claims, 3 Drawing Sheets

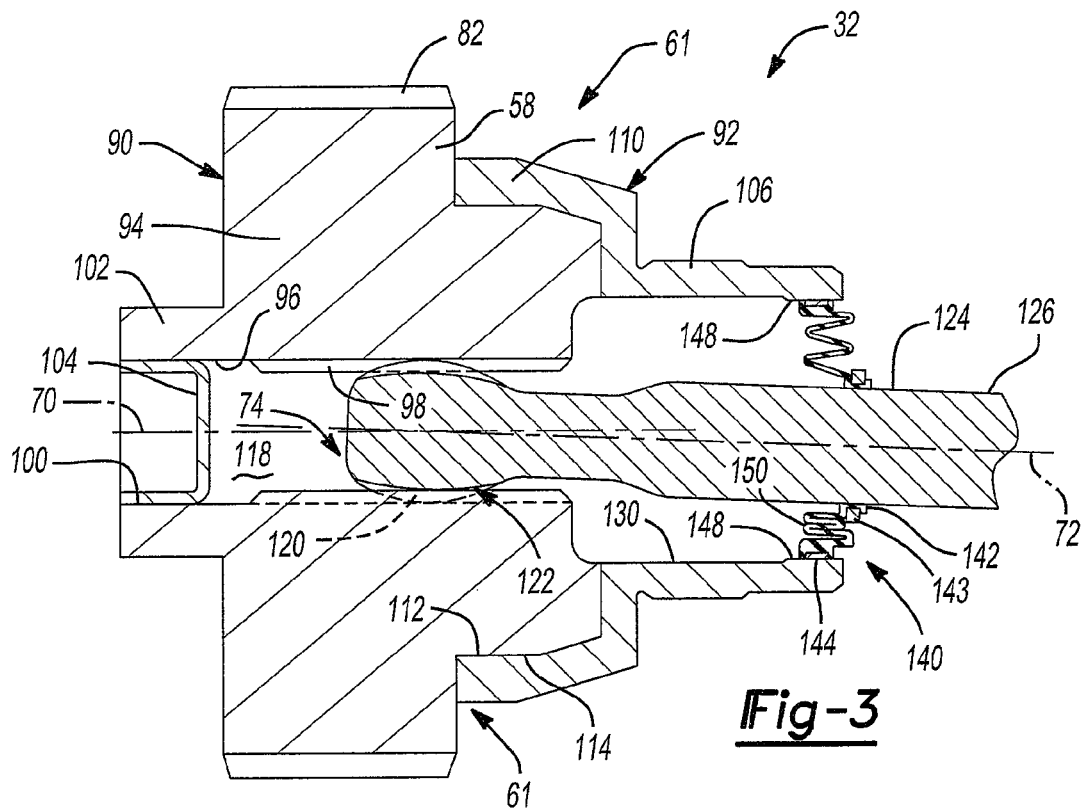
Fig-3
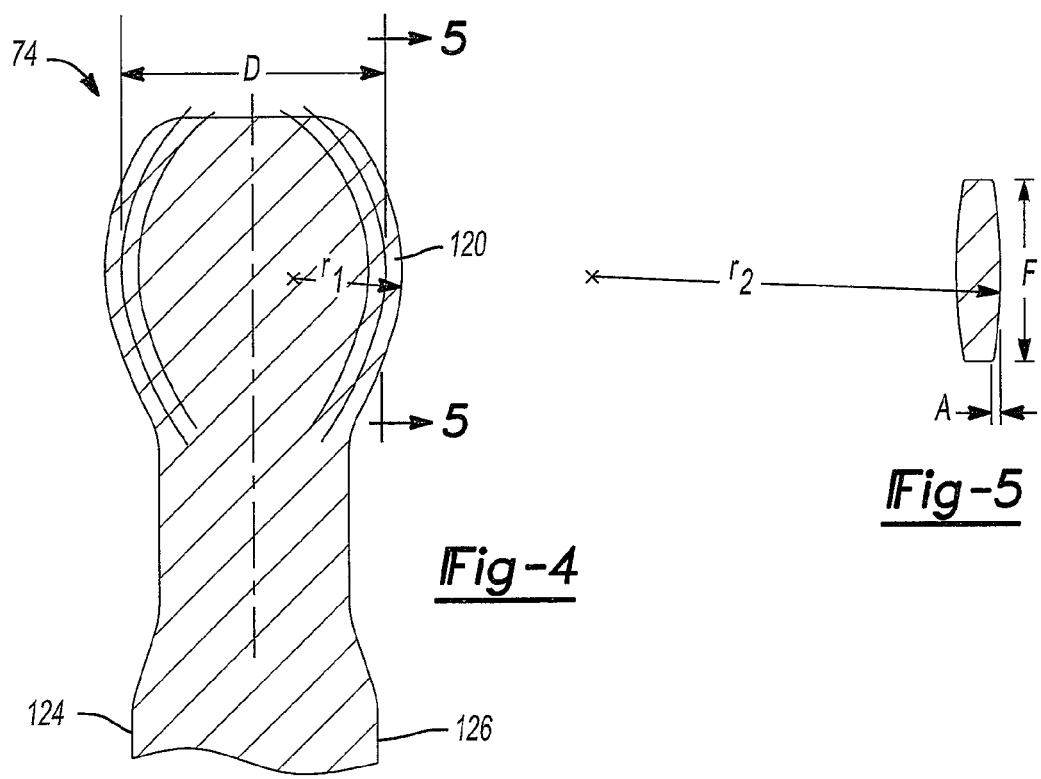
Fig-4
Fig-5

__US 7,992,668 B2__

LOW-ANGLE SPLINE COUPLING FOR POWER TRANSMISSION UNITS

FIELD

The present disclosure relates generally to a power transmission device for use in a motor vehicle. More particularly, the present disclosure describes a transfer case having a first output shaft and an articulatable second output shaft for providing drive torque to first and second drivelines of a four-wheel drive vehicle.

BACKGROUND

Many sport-utility vehicles are equipped with a transfer case for transmitting drive torque to all four of the wheels, thereby establishing a four-wheel drive mode of operation. Most transfer cases include a first output shaft rotating about a first axis for transferring torque to a primary (i.e., rear) driveline. A second output shaft extends along an axis offset from and parallel to the first axis to transfer torque to a secondary (i.e., front) driveline.

In the past, the vehicle ride height and suspension configuration of many sport-utility vehicles provided sufficient packaging volume for a traditional transfer case having the output shafts extending parallel to one another. In view of increased consumer demand for smaller four-wheel drive vehicles, the packaging volume allocated to the vehicle powertrain has been greatly reduced. While traditional transfer case designs may function in a satisfactory manner in certain vehicle applications, a need for an improved, easily packaged power transmission device exists.

SUMMARY OF THE INVENTION

A power transmission device for a four-wheel drive vehicle includes an input shaft adapted to be driven by a power source. A first output shaft is rotatable about a first axis and adapted to transmit torque to a first driveline. A second output shaft is adapted to transmit torque to a second driveline and is rotatable about a second axis. The first and second axes diverge from one another. A transfer unit includes a drive member driven by the first output shaft and a driven member driving the second output shaft. A spline coupling is positioned within a cavity formed in the driven member to drivingly interconnect the driven member and the second output shaft. The second output shaft is axially moveable relative to the driven member.

In another form, a power transmission device for use in a four-wheel drive vehicle includes an input shaft adapted to be driven by a power source. A first output shaft is rotatable about a first axis and adapted to transmit torque to a first driveline. A second output shaft is adapted to transmit torque to a second driveline. The second output shaft is rotatable about a second axis. The first and second axes are not parallel to one another. A transfer unit includes a drive member driven by the first output shaft and a driven member driving the second output shaft. The drive member and the driven member are in a torque transferring arrangement with one another. A spline coupling interconnects the driven member and the second output shaft. The second output shaft includes a curved spline drivingly engaged with a spline formed on the driven member.

BRIEF DESCRIPTION OF THE DRAWINGS

The disclosure will now be described, by way of example, with reference to the accompanying drawings in which:

FIG. 3 is a cross-sectional view of an output shaft assembly member associated with the power transmission device shown in FIG. 2; and FIGS. 4 and 5 are cross-sectional views of a crowned spline.

DETAILED DESCRIPTION OF THE PREFERRED EMBODIMENTS

In general, the present disclosure relates to a power transmission device for a motor vehicle having a first output shaft rotatable about a first axis and a second output shaft that rotates about a second axis of rotation. The first and second axes need not be parallel to one another. A clutch actuation system may operate a clutch associated with the first and second output shafts of the power transmission device for selectively or automatically shifting between a four-wheel drive mode and a two-wheel drive mode. A low-angle spline coupling is associated with the second output shaft to allow the second output shaft to rotate about the second axis that need not extend parallel to the first axis.

Figure 1:
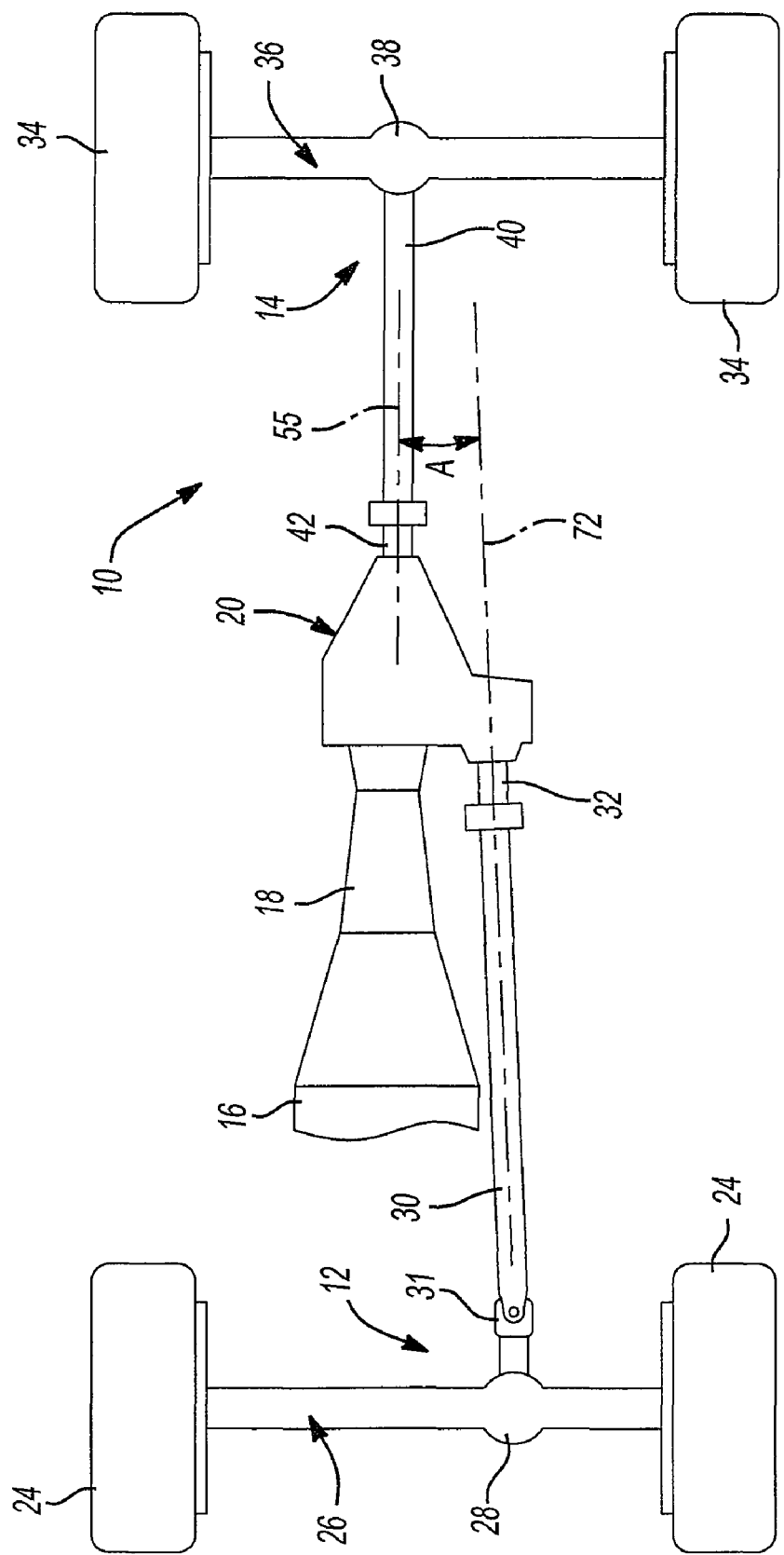
FIG. 1 is a schematic illustrating the drivetrain of a motor vehicle equipped with a power transmission device of the present disclosure.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is a four-wheel drive system which incorporates a power transmission device 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propeller shaft 30 by a universal joint 31. The opposite end of front propeller shaft 30 is coupled to a second or front output shaft assembly 32 of power transmission device 20. Similarly, rear driveline 14 includes a pair of rear wheels 34 connected at opposite ends of a rear axle assembly 36 having a rear differential 38 coupled to one end of a rear propeller shaft 40, the opposite end of which is interconnected to a first or rear output shaft 42 of power transmission device 20.

Figure 2:
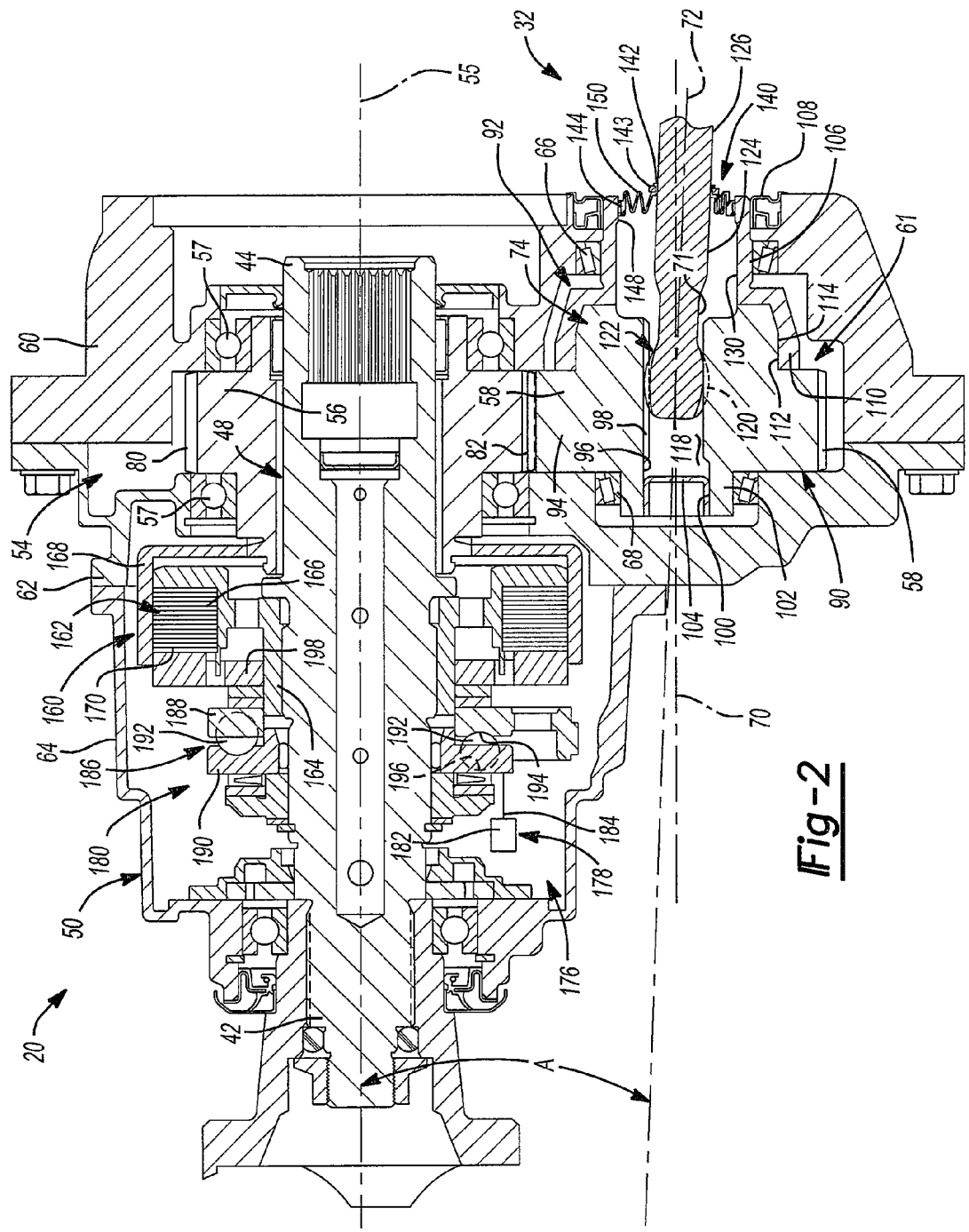
FIG. 2 is a cross-sectional view of the power transmission device according to the present disclosure.

With particular reference to FIG. 2 of the drawings, power transmission device 20 is shown to include an input shaft 44 adapted for connection to an output shaft of transmission 18 such that both are rotatably driven by engine 16 of the motor vehicle. In the arrangement depicted, rear output shaft 42 is integrally formed with input shaft 44 as a one-piece first shaft 48 that is rotatably supported in a housing assembly 50. Housing assembly 50 includes separable first, second and third housings 60, 62 and 64, respectively. Front output or second output shaft assembly 32 is also rotatably supported in housing assembly 50.

A transfer assembly 54 is provided for selectively transferring drive torque from first shaft 48 to second output shaft assembly 32. Transfer assembly 54 includes a first or drive gear 56 rotatably supported within housing assembly 50 by bearings 57. First shaft 48 is rotatable about a first axis 55 relative to drive gear 56. A second or driven gear 58 is in constant meshed engagement with drive gear 56. Driven gear 58 is formed as a part of second output shaft assembly 32. More particularly, second output shaft assembly 32 includes a shell 61 rotatably supported within first housing 60 by a first angular contact bearing 66. A second angular contact bearing 68 is positioned within second housing 62 to support shell 61 for rotation about a second axis 70. Second output shaft assembly 32 also includes a spline shaft 71 that is rotatable about a third axis 72 based on the use of a spline coupling 74. First axis 55 and third axis 72 diverge from one another and define an included angle A. Third axis 72 may intersect first axis 55 or may extend skew such that the first and third axes 55, 72 never intersect. In the example depicted in FIGS. 1 and 2, angle A ranges substantially from 0.0 to 5.0 degrees.

Drive gear 56 is shown to include teeth 80 defining a circular cylindrical outer shape. Teeth 80 may be straight spur-type gear teeth or alternatively may be helically shaped. Driven gear 58 includes a set of circumferentially spaced apart teeth 82 in constant meshed engagement with teeth 80. Teeth 82 are also depicted as having a circular cylindrical shape. It should be appreciated that alternate transfer assemblies are contemplated for use within power transmission device 20. For example, one or more beveled gears may be substituted for drive gear 56 and/or driven gear 58. A set of sprockets drivingly interconnected by a chain, as shown in U.S. Pat. No. 7,033,300 incorporated herein by reference in its entirety, may also be substituted as long as the driven member houses spline coupling 74.

As best shown in FIGS. 2 and 3, second output shaft assembly 32 is a multi-part assembly including shell 61 having a first portion 90 fixed to a second portion 92. First portion 90 includes driven gear 58 integrally formed with a body 94. In an alternate arrangement (not shown), driven gear 58 may be formed separately and subsequently fixed to body 94. A bore 96 extends through body 94. An internal spline 98 is formed along a portion of bore 96. The remaining portion of bore 96 includes a substantially cylindrical wall 100. Spline 98 is preferably formed as a standard internal straight spline. A first hub 102 axially extends from body 94. Angular contact bearing 68 supports hub 102 for rotation. Angular contact bearing 68 may include tapered rollers, balls or a variety of other configurations designed to accurately support second output shaft assembly 32 for rotation within second housing 62 as well as react axial loading that may be generated due to the use of spline coupling 74. A plug 104 is fitted within bore 96 to engage wall 100 in a press-fit to close one end of bore 96.

Second portion 92 includes a second hub 106 supported for rotation by angular contact bearing 66. A seal assembly 108 restricts contaminants from entering housing assembly 50 while allowing driven gear 58 to rotate relative thereto. Second portion 92 also includes a bell 110 having an inner diameter defined by a wall 112. Wall 112 surrounds a boss 114 formed on body 94 to form shell 61.

Spline coupling 74 is positioned within a cavity 118 defined by shell 61. Spline coupling 74 includes a curved spline 120 formed on spline shaft 71 engaging internal spline 98. Spline shaft 71 includes a bulbous first end 122 including curved spline 120, a substantially smooth cylindrical portion 124 and an opposite second end 126. Spline shaft 71 extends through a bore 130 formed in second portion 92. Spline shaft 71 may be constrained such that axis 72 defines a constant angle A or spline shaft 71 may articulate during operation. Furthermore, it should be appreciated that spline shaft 71 is free to axially translate relative to shell 61. Second end 126 is adapted to be fixed for rotation with front propeller shaft 30 and may include a standard external spline, flange or another coupler.

Curved spline 120 may be formed as one of a multi-radius, crowned, or double tapered spline to allow spline shaft 71 to articulate and vary angle A in relation to axis 70. For a crowned spline, a root line of the spline is a radius. American Standard tooth forms may be used for crowned external splines so that they may be mated with straight internal splines of Standard form. FIGS. 4 and 5 depict a crowned spline having a radius of the crown, $r_1$; a radius of curvature of the crowned tooth, $r_2$; a pitched diameter of the spline, D; a face width, F; and a relief or crown height, A at the ends of the teeth. Crown height A may be made somewhat greater than one-half the face width F multiplied by the tangent of the misalignment angle. For a crown height A, the approximate radius of curvature, $r_2=F^2 \div 8A$ and $r_1=r_2 \tan \phi$, where $\phi$ is the pressure angle of the spline. The crowned spline may be used in applications where angle A may be multiple different angles or a dynamically varying angle. It is contemplated that angle A may vary approximately plus or minus two degrees when curved spline 120 is shaped as a crowned spline.

Curved spline 120 may alternatively be shaped as a double tapered spline. In a double tapered spline, the root line of the spline is a shallow inverted "V" shape. U.S. Pat. No. 4,132,090 describes such a spline and is incorporated herein by reference. Angle A may range plus or minus five degrees to define an initial installed angle A. In operation, it may be desirable to have angle A vary less than plus or minus 0.5 degrees from the initial angle A setting. As such, the double tapered spline is typically used in applications where angle A is substantially fixed throughout operation.

Regardless of the shape of curved spline 120, it may be desirable to coat the contact surfaces of internal spline 98 and curved spline 120 with a lubricant to minimize fretting. Output shaft assembly 32 also includes a convoluted boot 140 to resist ingress of contamination and prevent egress of the spline lubricant. Boot 140 includes a first end 142 fixed to cylindrical portion 124 of spline shaft 71 by a clamp 143. A second end 144 is fixed to second portion 92. In the Figures, convoluted boot 140 is press-fit into engagement with an inner wall 148 of bore 130. Other interconnection methods may also be used. Convoluted boot 140 includes an elastomeric body 150 having at least one convolution to allow axial and angular displacement of spline shaft 71 relative to shell 61.

To provide means for establishing a drive connection between first shaft 48 and second output shaft assembly 32, power transmission device 20 includes a mode shift mechanism 160. Mode shift mechanism 160 includes a mode clutch 162 which is operable to couple drive gear 56 to first shaft 48 for establishing a four-wheel drive mode in which second output shaft assembly 32 is rigidly coupled for rotation with first shaft 48. In addition, mode clutch 162 is operable for selectively decoupling drive gear 56 from first shaft 48 for establishing a two-wheel drive mode in which all drive torque is delivered to rear output shaft 42.

According to the embodiment shown in FIG. 2, mode clutch 162 is normally operable in a non-actuated mode for transmitting all drive torque to rear output shaft 42, thereby establishing the two-wheel drive mode. Mode clutch 162 is also operable in a fully-actuated mode for establishing a "locked" four-wheel drive mode in which front output shaft assembly 32 is rigidly coupled to rear output shaft 42. In the embodiment shown in FIG. 2, mode clutch 162 is a friction plate clutch. Mode clutch 162 may be controlled to progressively regulate the amount of torque transferred to front output shaft assembly 32 automatically (i.e., on-demand) between its non-actuated and fully-actuated modes in response to and as a function of the amount of relative rotation (i.e., interaxle slip) between front output shaft assembly 32 and rear output shaft 42. The torque versus slip characteristics of mode clutch 162 can be tuned to meet specific vehicular applications.

Mode clutch 162 includes an inner hub 164 fixed to first shaft 48 and to which a set of inner clutch plates 166 are fixed. Mode clutch 162 also includes a drum 168 fixed for rotation with drive gear 56. Drum 168 is cylindrical and has a set of outer clutch plates 170 fixed thereto which are alternately interleaved with inner clutch plates 166 to define a multi-plate clutch pack. Other physical arrangements of mode clutch 162 (not shown) may perform the same function and are contemplated as being within the scope of the present disclosure.

A clutch actuation system 176 controls mode clutch 162. Clutch actuation system 176 includes an actuator 178 and may also include a rotary to linear movement conversion mechanism 180. In particular, actuator 178 includes a drive motor 182 for rotating a drive shaft 184. Drive shaft 184 is coupled to rotary to linear movement conversion mechanism 180. Rotary to linear movement conversion mechanism 180 includes a ball ramp unit 186. Ball ramp unit 186 includes a pair of cam rings 188, 190 and a plurality of balls 192. Each of cam rings 188 and 190 include grooves 194 and 196, respectively. Grooves 194 and 196 have varying depths. Balls 192 are positioned within grooves 194 and 196. When balls 192 are positioned at the deepest portion of grooves 194 and 196, cam rings 188 and 190 are spaced apart a first distance from one another. Cam ring 190 is rotatable relative to cam ring 188 to cause balls 192 to be positioned within the shallow portion of grooves 194 and 196. At this position, cam rings 188 and 190 are spaced apart from one another a distance greater than the first distance. In this manner, ball ramp unit 186 is operable to convert rotary motion to linear motion.

In operation, clutch actuation system 176 is controlled to apply a force on the mode clutch 162. Drive motor 182 rotates drive shaft 184 in a first direction which rotates cam ring 190 relative to cam ring 188 to axially move cam ring 188 and apply a force to an apply plate 198. Inner clutch plates 166 are frictionally engaged with outer clutch plates 170 by apply plate 198 to transfer drive torque from rear output shaft 42 to front output shaft assembly 32. Rotating drive motor 182 in the reverse direction rotates cam ring 190 back to a start position thereby removing the application force from mode clutch 162. Thus, second output shaft assembly 32 is no longer driven by first shaft 48. Alternatively, actuator 178 need not be configured to include a drive motor but may utilize other force transmitting mechanisms as appropriate. Furthermore, it should be appreciated that the clutch actuation system previously described may be replaced with a variety of other force application devices including hydraulically or electrically powered pumps acting on one or more pistons, motors driving one or more gearsets and power screws, among others.

The foregoing discussion discloses and describes various embodiments of the present disclosure. One skilled in the art will readily recognize from such discussion, and from the accompanying drawings and claims, that various changes, modifications and variations can be made therein without departing from the true spirit and fair scope of the disclosure as defined in the following claims.

What is claimed is:

1. A power transmission device for use in a four-wheel drive vehicle having a power source and first and second drivelines, the power transmission device comprising:
   an input shaft adapted to be driven by the power source;
   a first output shaft being rotatable about a first axis and adapted to transmit torque to the first driveline;
   a second output shaft adapted to transmit torque to the second driveline, the second output shaft being rotatable about a second axis, wherein the first and second axes diverge from one another;
   a transfer unit having a drive member driven by the first output shaft and a driven member driving the second output shaft, the drive member and the driven member being in a torque transferring arrangement with one another; and
   a spline coupling positioned within a cavity formed in the driven member and drivingly interconnecting the driven member and the second output shaft, wherein the second output shaft is axially moveable relative to the driven member and the spline coupling includes a convex curved spline formed on the second output shaft.

2. The power transmission device of claim 1 wherein the driven member includes an internal straight spline in driving engagement with the curved spline.

3. The power transmission device of claim 2 wherein the curved spline has a crowned shape.

4. The power transmission device of claim 2 wherein the curved spline has a double tapered shape.

5. The power transmission device of claim 1 wherein the driven member includes first and second portions fixed for rotation with each other.

6. The power transmission device of claim 5 wherein the first portion includes a first hub and the second portion includes a second hub, each hub being rotatably supported within a housing of the power transmission device.

7. The power transmission device of claim 5 wherein each of the first portion, the second portion and the second output shaft rotate at the same speed.

8. The power transmission device of claim 1 further including a clutch selectively operable to transfer drive torque between the first output shaft and the drive member, and a clutch actuation system operable to control the clutch.

9. The power transmission device of claim 1 wherein the drive member includes cylindrically-shaped teeth engaging cylindrically-shaped teeth formed on the driven member.

10. The power transmission device of claim 1 wherein the drive member and the driven member include spaced apart sprockets drivingly interconnected by a flexible member.

11. The power transmission device of claim 1 further including a convoluted boot fixed for rotation with the second output shaft and the driven member.

12. A power transmission device for use in a four-wheel drive vehicle having a power source and first and second drivelines, the power transmission device comprising:
   an input shaft adapted to be driven by the power source;
   a first output shaft being rotatable about a first axis and adapted to transmit torque to the first driveline;
   a second output shaft adapted to transmit torque to the second driveline, the second output shaft being rotatable about a second axis, wherein the first and second axes are not parallel to one another;
   a transfer unit having a drive member driven by the first output shaft and a driven member driving the second output shaft, the drive member and the driven member being in a torque transferring arrangement with one another; and
   a spline coupling interconnecting the driven member and the second output shaft, wherein the second output shaft includes a curved spline drivingly engaged with a spline formed on the driven member, and wherein the curved spline is formed on a bulbous end of the second output shaft and the driven member includes a cavity in receipt of the bulbous end.

13. The power transmission device of claim 12 wherein the second output shaft is axially moveable relative to the driven member.

* * * * *